United States Patent [19]

Grazioli

[11] Patent Number: 5,705,255
[45] Date of Patent: *Jan. 6, 1998

[54] METHOD AND AN APPARATUS FOR MAKING A GRAPHIC REPRESENTATION ON OBJECTS MADE OF A POLYOLEFIN POLYMER AND FILM FOR IMPLEMENTING SAID METHOD

[75] Inventor: Vittorio Grazioli, Asola, Italy

[73] Assignee: Grazioli S.p.A., Mosio di Acquanegra, Italy

[*] Notice: The term of this patent shall not extend beyond the expiration date of Pat. No. 5,512,227.

[21] Appl. No.: 509,330

[22] Filed: Jul. 31, 1995

[30] Foreign Application Priority Data

Jul. 29, 1994 [IT] Italy .................. MI94A1643

[51] Int. Cl.$^6$ ........................................ B32B 9/00
[52] U.S. Cl. .................. 428/195; 428/203; 428/207; 428/214; 428/339; 428/412; 428/461; 428/463; 428/515; 264/132; 264/265; 264/275; 264/291; 156/229; 156/232; 156/240
[58] Field of Search .................. 428/195, 461, 428/412, 463, 522, 207, 339, 203, 214, 515; 156/240, 196, 232, 209, 229; 264/132, 265, 275, 291, 129, 26, 22, 509, 259, 258, 247, 266

[56] References Cited

U.S. PATENT DOCUMENTS

| | | |
|---|---|---|
| 3,654,062 | 4/1972 | Loew .................. 264/259 |
| 3,668,034 | 6/1972 | Arthur et al. . |
| 4,795,597 | 1/1989 | Whileley et al. .................. 264/22 |
| 5,227,222 | 7/1993 | Yasuaki et al. .................. 428/195 |
| 5,254,302 | 10/1993 | Yamanaka .................. 264/129 |
| 5,334,450 | 8/1994 | Zabrocki et al. .................. 428/332 |

FOREIGN PATENT DOCUMENTS

| | | |
|---|---|---|
| A-2 150 209 | 4/1973 | France . |
| A-41 31 223 | 3/1992 | Germany . |
| A-0 619 171 | 10/1994 | Germany . |
| A-2 092 511 | 8/1982 | United Kingdom . |
| WO-A-92 12008 | 7/1992 | WIPO . |

*Primary Examiner*—Patrick Ryan
*Assistant Examiner*—Abraham Bahta
*Attorney, Agent, or Firm*—Herbert Dubno

[57] ABSTRACT

The method for making a graphic representation on objects made of a polyolefin polymer, consists of printing a graphic representation on a face of a first film made of a stretched polymer, chosen among a polyester polymer and an acrylic polymer, associating the first film with a second film in order to obtain a membrane formed by the associated first and second films containing the graphic representation between them, transferring the membrane inside an injection mold and injecting a polyolefin polymer in the mold for forming the object, obtaining at least a partial melting of the second film so that the membrane forms one body with said object.

26 Claims, No Drawings

METHOD AND AN APPARATUS FOR MAKING A GRAPHIC REPRESENTATION ON OBJECTS MADE OF A POLYOLEFIN POLYMER AND FILM FOR IMPLEMENTING SAID METHOD

FIELD OF THE INVENTION

The present invention relates to a method of and to an apparatus for making a graphic representation on objects made of a polyolefin polymer and to a film for implementing said method.

BACKGROUND OF THE INVENTION

As is known, currently, for reproducing a graphic representation on a plastic object, for example on an object made of a polyolefin polymer, such as polyethylene or polypropylene, a film is printed with a known printing system (rotogravure or flexographic printing). After printing, the film is either manually or mechanically introduced into a mold.

Subsequently, plastic (polyethylene or polypropylene) is injected into the mold for producing the desired object.

Drawings, signs and the like, are currently printed by this method on small objects of common use.

This method has the disadvantage that the film perfectly integrates in the object on which it is applied only in the regions which are not printed, while on the printed film surface, the film only rests on the object surface because the inks constitute a "barrier" to the molecular penetration between the film and the material constituting the object. Moreover the film, in order to be printed, requires a flame surface treatment or a high frequency electric discharge (corona effect) surface treatment, before printing with ink. For improving the adhesion of the inks it is also possible to use a hot chemical etching with a highly oxidizing solution, such as chromic acid, oleum, and chlorosulphonic acid.

As has been said, the ink creates a "barrier" to the adhesion of the printed portion to both the polyethylene and the polypropylene.

As will be readily understood, the barrier causes the graphic representation to detach especially when the printed portion of the film is subjected to an abrasive action or denting.

Furthermore, the described method only allows printing only of small graphic designs on small objects.

In fact, the greater the size of the design, the greater are the chances of its detachment from the object and the more difficult it is to arrange it inside the mold, especially if this operation is performed mechanically.

In order to obviate the above mentioned drawbacks, another type of transfer is used for transferring a design to a plastic object.

For this purpose, by means of a calender for thermal printing, the colors are sublimated from the paper on the surface of the object to be printed.

This system allows to printing of a design only on small objects and on substantially planar surfaces. It is also so expensive that its use is limited to selected and limited cases.

European Patent application No. 94108168.9, in the name of this same applicant, was filed before the priority date of the present application and published later than said priority date. European Patent application No. 94108168.9 discloses the use of an external polypropylene film, a graphic representation printed between the external film and an internal film such that the internal film partially melts during injection molding of an object on the film. It has been found however, that this system has a limited duration, namely the adhesion between the layers diminishes after a while.

OBJECTS OF THE INVENTION

It is the object of the present invention to obviate the above drawbacks.

An important object of the invention is to provide a method and an apparatus for making a graphic representation on objects made of a polyolefin polymer, wherein the graphic representation (printed and unprinted portions) is totally integrated with the material of the object on which the design has to be printed by an effective molecular integration.

A further important object of the invention is to provide a method of and an apparatus for making a graphic representation on objects made of a polyolefin polymer, which are extremely economical and which ensure a long durability of the representation.

A further object of the invention is to provide a method of and an apparatus for making a graphic representation on objects made of a polyolefin polymer, which can be used, without any problem, also for large graphic representations adapted to be transferred to, for example, toys, outdoor seats and tables, etc.

A further object of the invention is to provide a method and an apparatus for making a graphic representation on objects made of a polyolefin polymer, which can be used in existing production lines without substantial modifications.

A further object of the invention is to obtain four-color process prints of the best quality through successive printing passages with different coloring agents.

Not least, it is an object of the invention is to provide a method of and an apparatus for making a graphic representation on objects made of a polyolefin polymer, which allow an easy and durable application on an object, for example made of polypropylene, in order to endure thermic, mechanical and physical actions without spoiling even after a long time.

DESCRIPTION OF THE INVENTION

These objects are substantially achieved by a method for making a graphic representation on objects made of a polyolefin polymer, which comprises: printing a graphic representation on a face of a first transparent film chosen among a polyester polymer, an acrylic polymer and an polyamide polymer, associating said first printed film with a second film in order to obtain a membrane formed by said associated first and second films containing said graphic representation between them, transferring said membrane into an injection mold and injecting a polyolefin polymer in said mold for forming said object, obtaining at least a partial melting of said second film in order that said membrane forms one body with said object; and one graphic representation is visible exclusively through said transparent first film.

Preferably, the polyester polymer is selected from PET (polyethyleneterephthalate), PBT (polybutyleneterephthalate) and PC (polycarbonate).

Preferably, the acrylic polymer is a polyalkyl methacrylate, more preferably a polymethyl methacrylate or a polydimethyl methacrylate.

The method is achieved by an apparatus for making a graphic representation on objects made of a polyolefin polymer, which comprises grip means for transferring said perfectly tense membrane at said mold, and means for electrostatically charging said membrane for a perfect adhesion of said membrane to said mold.

Conveniently, the membrane for making a graphic representation on objects made of a polyolefin polymer, comprises a first film chosen from a polyester polymer, an acrylic polymer and an polyamide polymer, the graphic representation being printed on one face of said first film, said first film being associated, through an adhesive, with a second film, in unstretched polypropylene, so that the graphic representation is visible exclusively through said transparent first film.

Preferably, said first film contains additives for increasing its resistance to ultraviolet rays.

The present invention relates to an injection molded object comprising an external layer formed by a polymer selected from a polyester polymer, an acrylic polymer and an polyamide polymer, a first lower layer formed by at least one ink adapted to define a graphic representation, a second lower layer formed an adhesive polymer, a third lower layer formed by a polyolefin polymer having a melting point lower than that of said external layer, said third layer adhering by melting to the body of said printed object.

It has been verified in practice that the selection of said first film from a polyester polymer, an acrylic polymer and an polyamide polymer has advantages over the case where said first film is of polypropylene. In particular, the advantages are a greater transparency, an increased hardness and therefore a better resistance to scratches and wear and a greater brilliance. This is especially true for a polymethyl methacrylate film.

In the case the first film is a polyester, preferably, the melting point of the first film is comprised between 185° and 300° C., more preferably between 205° and 280° C. and still more preferably between 220° and 265° C.

Preferably, the melting point of the second film is comprised between 120° and 190° C. and more preferably between 135° and 170° C. and still more preferably between 145° and 150° C.

Preferably the polymethyl methacrylate is formed by 80% by weight of methyl acrylate and up to 20% by weight of acrylic esther or other monomers.

Preferably, the first film is soluble in a solvent of the ink used for printing said graphic representation. Preferably the solvent is ethyl acetate and the first film is formed by polymethyl methacrylate.

Further characteristics and advantages of the invention will be more apparent by the description of a preferred but not exclusive embodiment of a method and an apparatus for making a graphic representation on objects made of a polyolefin polymer, wherein the method, according to the invention, is performed by the following succession of steps.

First, the starting material constituted by a granulated polymer selected from a polyester polymer, an acrylic polymer and an polyamide polymer, plus a per se known additive for increasing the resistance to ultraviolet rays for protecting the polymer from the action of atmospheric oxygen and solar light, is extruded. Thanks to the additives the resistance to thermal aging and to light improves from about 1-2 months to about 2-3 years of continuous use.

A film of selected height and size is thus obtained which is subsequently flame treated in order to ensure the adhesion of ink and/or adhesives.

Then the graphic representation, which will eventually be transferred to the object to be decorated, is printed on the first film.

This printing is performed in a per se known manner by rotogravure or flexographic printing.

By means of a polyurethane adhesive, which is also protected from ultraviolet rays for preventing it from yellowing, the first film is associated with a second unstretched polypropylene film.

In particular, the polyurethane adhesive is protected from UV rays thanks to the inclusion of specific additives belonging to the monomeric HALS class and preferably to the monomeric methyl-hindered HALS class.

Preferably, the adhesive contains a solvent in which the first film is soluble. In case the first film is PMMA the solvent is preferably ethyl acetate, even though it is possible to use ethyl alcohol. The PMMA is rapidly attacked by ethyl acetate and just slightly attacked by ethyl alcohol. It is however possible to use also so called "solvent free" polyurethane adhesives.

In this manner, the associated first and second films form a membrane containing the graphic representation between the films, the graphic representation being thus perfectly protected both above and below.

The application of the second polypropylene film to the first film provides two advantages.

On the one hand, it makes the printing ink adhere to and cover the object completely, eliminating the inconvenience of the prior art in that region where the polypropylene film did not adhere to the object.

The second advantage is that, during injection of the material (for example polypropylene) for forming the object, the second film tends to at least partially melt thereby providing a perfect integration of the second film molecules with the polypropylene.

In particular, after the membrane has been obtained in the above described manner, the membrane is trimmed to the desired size. The desired graphic representation is then gripped and kept perfectly stretched and, before being applied to the mold, it is electrostatically charged.

The electrostatic charge makes the membrane adhere inside the mold perfectly, so that it assumes the same shape, even if the mold does not have a perfectly plane surface, but rather has lowered and raised regions according to the object to be molded.

Of course, the membrane has the first film against the mold while the second film is inside the mold so that it is contacted by the injected polypropylene membrane, but indirectly in order not to move the membrane from its position.

Preferably, the second film has a melting point substantially lower than the temperature of the polyolefin polymer forming the object on which the graphic representation will be applied, when it goes into contact with the second film during the injection molding.

COMPARATIVE EXAMPLES 1–5

The first film is constituted by a high rigidity bioriented polypropylene having a melting point of 163° C. and conveniently stabilized with a monomeric and polymeric HALS mixture.

The first film is superficially flame treated for rendering it printable and is printed by a flexographic or rotogravure process and with inks having high resistance to the light. In the examples 1–4 the ink solvent is ethyl acetate. In example 5 the ink solvent is ethyl alcohol. In all the examples the first film is not soluble in the ink solvent.

The first film is spread with polyurethane adhesive which, in examples 1, 2 and 5 is an ethyl acetate based solvent, while in examples 3 and 4 is "solvent free". The polyurethane adhesive added with a a monomeric methyl-hindered HALS mixture for improving the resistance to light.

The first film, printed and glued, is then glued to the second film constituted by random copolymer polypropylene having a melting point of 148° C.

The membrane, thus formed, after a time sufficient for the adhesive reticulation, is trimmed for obtaining the exact shapes to be inserted into the mold, in order to obtain, by injection molding, the object on the surface thereof the graphic representation has to be visible.

EXAMPLE 6 ACCORDING TO THE INVENTION

Example 1 is repeated with the exception that the first film, instead of polypropylene, is constituted by high rigidity bioriented polyethyleneterephthalate having a melting point of 256° C. and conveniently stabilized with a monomeric and polymeric HALS mixture.

The ink solvent is ethyl acetate. The adhesive solvent is ethyl acetate.

EXAMPLES 7–40 ACCORDING TO THE INVENTION

Example 1 is repeated with the exception that the first film, instead of bioriented polypropylene, is constituted by polymethyl acrylate.

The ink solvent is ethyl acetate. The adhesive solvent is ethyl acetate. The polymethyl acrylate is soluble in the ethyl acetate.

RESISTANCE TESTS

The results of examples 1–40 have been subjected to two series of tests for evaluating the adhesion of the first and second films.

In the first series of tests the sample obtained with the above examples is subjected to a series of rather drastic thermal cycles for verifying after how many cycles the films separate. In each thermal cycle the sample is treated at variable temperature: immersed in water at 23° C. for eight hours, for 16 hours treated with air at 100° C. The number of thermal cycles required for separating the films is indicated in the enclosed table.

In the second series of tests, the sample obtained with the above examples is subjected to a series of radiation cycles for verifying after how many total hours the films separate. In each radiation cycle the sample is subjected to 8 hours of ultraviolet radiations UVB and to 4 hours of condensate at 40° C., wherein the lamps are turned off and water evaporates from the bottom condensating on the samples. The number of hours required for separating the films is indicated in the enclosed table.

TABLE

| example | thermal cycle number of cycles | radiation cycle hours |
|---|---|---|
| 1 | 1–2 | 45–60 |
| 2 | 20 | 260 |
| 3 | 20 | 300 |
| 4 | 3–6 | 150 |
| 5 | 27 | 800 |
| 6 | 6 | 100 |
| 7 | >30 | 4000 |

TABLE-continued

| example | thermal cycle number of cycles | radiation cycle hours |
|---|---|---|
| 8–31 | (interrupted) >30 (interrupted) | >2700 (in course) |
| 32–40 | >30 (interrupted) | >1900 (in course) |

It is apparent from the table that the samples produced according to the invention achieve a resistance to separation which is more than ten times that of the average duration of the comparative examples. It has then been verified that, by repeating the above examples with the addition of a further protection against aging of the polyurethane adhesive, there is an improvement in the resistance to the solar light. Such further protection is obtained during the printing step of the graphic representation, by covering all the remaining regions of the first film which are not affected by the graphic representation, with an ink having the same color of the object on which the membrane is applied.

In this manner, the polyurethane adhesive, between the two films, is not directly exposed to the solar light.

The application of the above described membrane is performed with an apparatus comprising grip means, for example holes or suckers for sucking air, for grabbing the perfectly stretched membrane and moving it to the mold.

The same support plate of the grip means, kinematically operated by numerical control, according to the known art, advantageously comprises means for electrostatically charging the membrane so that the membrane may perfectly adhere to the mold where it is arranged.

Also the means for electrostatically charging may be any as far as they charge the membrane sufficiently for the above described requirements.

The present invention also relates to the polypropylene membrane for implementing the above described method.

The invention achieves the intended aims and has important and considerable advantages.

It is in fact being devised a new method for making a graphic representation on objects made of a polyolefin polymer; the method achieves a perfect integration of the graphic representation support membrane with the object surface.

Furthermore, the membrane applied in this manner is considerably durable and is resistant to possible scratches and abrasions.

The invention thus conceived may have numerous modifications and variations, all within the inventive concept.

I claim:

1. A method of making a graphic representation on an object made of a polyolefin polymer, comprising the steps of:

printing a graphic representation on a face of a first transparent film selected from the group which consists of a polyester polymer, an acrylic polymer and an polyamide polymer to form a first printed film;

associating said first printed film with a second film in order to obtain a membrane formed by said associated first and second films containing said graphic representation between them;

transferring said membrane into an injection mold; and injecting a polyolefin polymer in said mold for forming said object, obtaining at least a partial melting of said second film in order that said membrane forms one body with said object and said graphic representation is visible exclusively through said transparent first film.

2. The method defined in claim 1, wherein said second film is substantially unstretched polypropylene.

3. The method defined in claim 1 wherein at least said first film is first stabilized with additives for improving its resistance to the atmospheric oxygen and to solar light.

4. The method defined in claim 1 wherein said second film has a melting point substantially lower than the temperature of said polymer injected into said mold when said polymer makes contact with said second film.

5. The method defined in claim 1 wherein an adhesive is disposed between said films, and said adhesive is protected from ultraviolet rays.

6. The method defined in claim 1 wherein said membrane is electrostatically charged before being inserted into said mold.

7. The method defined in claim 1 wherein said second film is produced with an unstretched polyolefin polymer.

8. The method defined in claim 1 wherein said first film and said second film are associated by an adhesive.

9. The method defined in claim 8 wherein said adhesive has a polyurethane base preferably added with a methyl-hindered monomeric HALS mixture.

10. The method defined in claim 1 wherein said first film is a polyester and the melting point of said first film is comprised between 185° C. and 300° C.

11. The method defined in claim 1 wherein the melting point of said second film is comprised between 120° C. and 190° C.

12. The method defined claim 1 wherein during the printing step of said graphic representation on said first film, the regions of said first film which are not affected by said graphic representation are covered by an ink having the same color as said object on which the membrane is applied.

13. The method defined in claim 1 wherein said polyester polymer is selected from the group which consists of PET (polyethyleneterephthalate), PBT (polybuthyleneterephthalate) and PC (polycarbonate).

14. The method defined in claim 1 wherein said acrylic polymer is a polymethyl methacrylate or a polydimethyl methacrylate.

15. The method defined in claim 1 wherein said first film is soluble in a solvent of an ink used for printing said graphic representation.

16. The method defined in claim 1 wherein said solvent is ethyl acetate, said first film being formed by polymethyl methacrylate.

17. The method defined in claim 1 wherein said first film has additives adapted to increase the resistance to ultraviolet rays.

18. A membrane for making a graphic representation on objects made of a polyolefin polymer, comprising a first transparent film formed by a polymer chosen selected from the group which consists of a polyester polymer, an acrylic polymer and a polyamide polymer, said graphic representation being printed on one face of said first film, said first film being associated with a second film, by means of a polypropylene adhesive, so that said graphic representation is visible through said transparent first film.

19. The membrane defined in claim 18 wherein said second film has a melting point substantially lower than the temperature of said polyolefin polymer when said polyolefin polymer is injected into a mold in which the membrane is disposed, when said polyolefin polymer makes contact with said second film.

20. The membrane defined in claim 18, containing additives for increasing its resistance to ultraviolet rays.

21. The membrane defined in claim 18 wherein said acrylic polymer is a polyalkyl methacrylate selected from the group which consists of a polymethyl methacrylate and polydimethyl methacrylate.

22. An injection molded object comprising an external layer formed by a polymer selected from the group which consists of a polyester polymer, an acrylic polymer and a polyamide polymer, a first lower layer formed by at least one ink adapted to define a graphic representation, a second lower layer formed by an adhesive polymer, a third lower layer formed by a polyolefin polymer having a lower melting point than that of said external layer, said third layer adhering by melting to the body of said molded object.

23. A molded object according to clam 22 wherein the melting point of said external layer is comprised between 185° C. and 300° C., and preferably between 205° C. and 280° C. and more preferably between 220° C., and 265° C., said external layer being formed with a polyester polymer.

24. The molded object defined in claim 22, wherein the melting point of said third layer is comprised between 120° C. and 190° C., and preferably between 135° C. and 170° C. and more preferably between 145° C. and 150 ° C.

25. The molded object defined in claim 22, wherein the melting point of the body of said molded object is higher than the melting point of said third layer.

26. The molded object defined in claim 22 wherein said acrylic polymer is a polyalkyl methacrylate selected from the group which consists of polymethyl methacrylate and polydimethyl methacrylate.

* * * * *